United States Patent [19]
Rubischko et al.

[11] 3,833,421
[45] Sept. 3, 1974

[54] SECONDARY ELECTROCHEMICAL CELLS WITH A CHALCOGEN CATHODE

[75] Inventors: Richard J. Rubischko, Minnetonka, Minn.; Elton J. Cairns, Lisle; Robert K. Steunenberg, Naperville, both of Ill.

[73] Assignee: The United States of America as represented by the United States Atomic Energy Commission, Washington, D.C.

[22] Filed: Dec. 27, 1972

[21] Appl. No.: 318,806

[52] U.S. Cl............................ 136/6 LF, 136/20
[51] Int. Cl.............................................. H01m 35/00
[58] Field of Search............ 136/6 R, 6 LF, 6 A, 20, 136/83 T

[56] References Cited
UNITED STATES PATENTS

| | | | |
|---|---|---|---|
| 3,488,221 | 1/1970 | Shimotake et al. | 136/6 LF X |
| 3,531,324 | 9/1970 | Fischer et al. | 136/6 LF X |
| 3,716,409 | 2/1973 | Cairns et al. | 136/6 |
| 3,730,771 | 5/1973 | Tannenberger et al. | 136/6 |

*Primary Examiner*—Winston A. Douglas
*Assistant Examiner*—C. F. Lefevour
*Attorney, Agent, or Firm*—John A. Horan; Arthur A. Churm; John A. Isaac

[57] ABSTRACT

This invention consists of a novel cathode, and a novel method for making such cathode, for use in a secondary electrochemical power-producing cell having an anode containing a molten alkali-metal of low electronegativity, an electrolyte containing alkali-metal ions, and a cathode containing a reactant comprising a chalcogen. The cathode comprises a solid, porous substrate structure, impregnable by the reactant, having interconnected pores. These interconnected pores have their interior surfaces partially coated with a layer of electronically-conducting metal wettable by the electrolyte and are filled with both the electrolyte and the chalcogen-containing reactant. The novel method for making this cathode structure comprises vapor depositing the electronically-conducting metal onto the surfaces of the interconnected pores by vaporizing a volatile compound containing the metal in the presence of an inert gas, and then passing the resulting vapor-inert gas mixture through the porous substrate structure while also passing an electric current therethrough. This structure is then impregnated with both electrolyte and a chalcogen-containing reactant.

4 Claims, 1 Drawing Figure

PATENTED SEP 3 1974
3,833,421
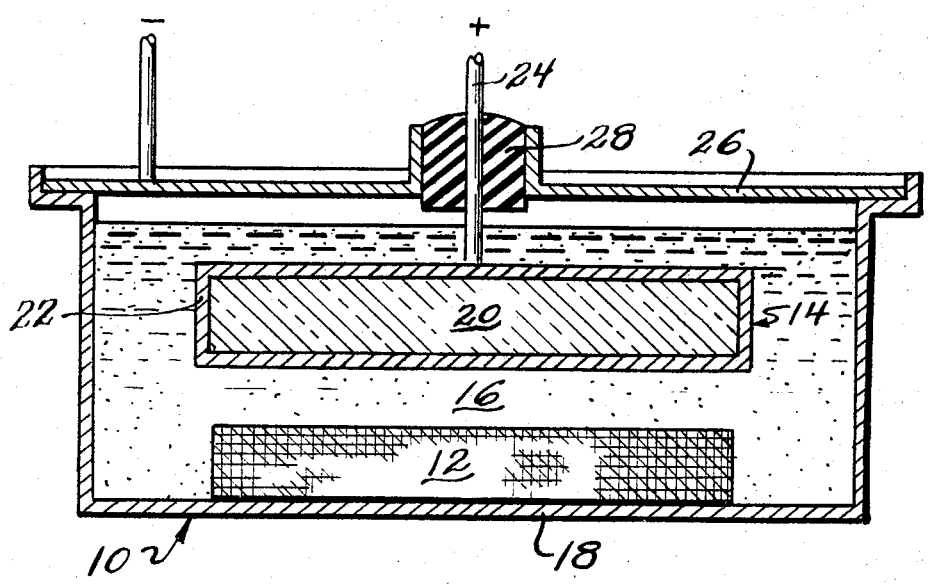

SECONDARY ELECTROCHEMICAL CELLS WITH A CHALCOGEN CATHODE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to electrochemical power-producing cells and more particularly to alkali-metal/chalcogen secondary cells. Specifically, the invention relates to a novel cathode, and a novel method for making such cathode, for use in secondary electrochemical cells whereby the number of chalcogen-electrolyte reaction sites within the cathode structure is significantly increased.

In our technologically-oriented society, there is an increasing need for compact, convenient, pollution-free electrical power sources and energy-storage devices. A large number of power-source needs, both civilian and military, have gone unfulfilled because of the limited capabilities of presently available batteries and engine-generators. In our attempt to satisfy these needs, a great deal of effort has been expended over the last decades in areas of energy conversion and energy storage. A large portion of the effort has involved electrochemical devices such as fuel cells, metal/air cells, secondary (electrically rechargeable) cells with both aqueous and nonaqueous electrolytes, and thermally regenerative cells.

One particular class of cells which has shown considerable promise for development into electrochemical cells useful in applications such as auxiliary power sources for military hybrid vehicles, battery power sources for electrically powered commercial vehicles and implantable batteries serving as power sources for artificial hearts, consists of secondary cells that operate at elevated temperatures. These cells employ molten alkali-metal anodes such as lithium or sodium (of low electronegativity, low equivalent weight, and high exchange-current density), molten-salt or cation-conducting solid electrolytes, and cathode materials of Groups VIA and VIIA of the periodic chart, the chalcogens and halogens. Of this class of cells, the alkali-metal/chalcogen cell having a molten-salt or paste electrolyte containing alkali-metal ions has shown significant progress in its development toward fulfilling the above-stated applications. Examples of such cells can be found in U.S. Pats. No. 3,488,221 and No. 3,531,324, both assigned to the assignee of the present invention.

A large number of factors and variables affect the performance of such alkali-metal (sodium or lithium)/chalcogen cells. One very important factor is the particular composition and/or structure of the cathode. Secondary cells have been tested utilizing many different cathode structures and compositions, and some have proven quite successful as with those disclosed in U.S. patent applications Ser. No. 178,577 (70) now U.S. Pat. No. 3,716,409, and Ser. No. 401,729 (70), both applications being assigned to the assignee of the present application. Such cathode structural and compositional variations significantly increased the performance of secondary electrochemical cells, enabling them to achieve high specific powers and specific energies. However, there remains a continuing effort to increase the number of chalcogen-electrolyte reaction sites within the cathode structure so as to increase the chalcogen utilization as well as reduce the problem of diffusion of the chalcogen-electrolyte reaction products away from the reaction sites.

In such secondary cells, electrons are required in the chalcogen-electrolyte reactions, and electronically-conducting materials, both metal and non-metal, are utilized in the cathodes of such cells to provide a path for the electrons to flow to the chalcogen-electrolyte interfaces. Therefore, it is desirable to obtain a large zone of contact between the chalcogen reactant, the electrolyte, and the electronically-conducting material throughout the entire cathode. Previous methods for achieving this included enclosing a chalcogen-impregnated porous substrate structure within an electrolyte-impregnated, electronically-conducting housing, alternating layers of chalcogen-impregnated porous substrate material with layers of electrolyte-impregnated electronically-conducting material, and mixing particles of electronically-conducting material and porous substrate material in a liquid mixture of chalcogen reactant and electrolyte. The inventors, however, have devised a new and novel cathode structure, and method of making, which greatly increases the described zone of contact, thereby increasing the number of chalcogen-electrolyte reaction sites. An electronically-conducting material which is well wetted by electrolyte is dispersed throughout the cathode by vapor-depositing the material on portions of the surfaces of the porous substrate structure's interconnected pores and subsequently impregnating this structure with both electrolyte and chalcogen-containing reactant. In this manner the contact zone between the chalcogen, the electrolyte, and the electronically-conducting material is considerably increased, yet the cathode current collector is a single solid structure which does not require any precision machining as is required with some of the previous cathode structures.

Therefore, it is one object of the present invention to provide a novel cathode structure for utilization in alkali-metal/chalcogen electrochemical cells.

It is another object of the present invention to provide a cathode structure with increased chalcogen-electrolyte reaction sites for use in alkali-metal/chalcogen secondary electrochemical cells.

It is a further object of the present invention to provide a novel method for making cathodes for use in alkali-metal/chalcogen electrochemical cells.

It is finally an object of the present invention to provide a method for depositing electronically-conducting metal on the interior surfaces of interconnected pores within a porous substrate structure.

Further objects and advantages of the invention will be apparent from the following detailed description.

SUMMARY OF THE INVENTION

In accordance with the present invention, a volatile compound of an electronically-conducting metal such as chromium is heated in the presence of an inert gas so as to vaporize the compound and form a gaseous mixture of compound vapor and inert gas. This gas mixture is heated and then passed for a given period of time through a porous substrate structure through which is also passed an electric current which uniformly heats the substrate structure, the compound vapor decomposing upon contact with the substrate material and depositing the metal on the surfaces of the structure's interconnected pores. After this time period, this porous substrate structure is removed from the gas flow and then impregnated first by a molten chalcogen-containing reactant and then by a molten electrolyte containing alkali-metal ions. This results in forming a novel cathode structure wherein the interconnected pores of the porous substrate structure have their interior surfaces partially coated with the electronically-conducting metal, which is wetted by the electrolyte, and are filled with the electrolyte and the chalcogen-containing reactant. This enables the cathode structure to maintain the chalcogen, the electrolyte and the electronically-conducting metal in close proximity to one another throughout the entire structure, thereby providing an extensive electron path to the chalcogen-electrolyte interfaces so as to significantly increase the number of chalcogen-electrolyte reaction sites.

BRIEF DESCRIPTION OF THE DRAWINGS

The FIGURE is a schematic of an electrochemical cell utilizing the cathode structure of the present invention.

DETAILED DESCRIPTION OF THE INVENTION

Turning first to the FIGURE, there is shown a secondary electrochemical cell 10 having an anode 12 and a cathode 14 separated by molten-salt electrolyte 16 and disposed within molybdenum housing 18. Anode 12 is in direct electrical contact with housing 18, thereby making the entire housing electrically negative. Cathode 14 consists of a cathode structure 20, the present invention, enclosed within porous graphite housing 22 which ensures retention of the chalcogen-containing reactant within structure 20. Attached to cathode 14 is positive electrical lead 24 which is electrically insulated from housing cover 26 by insulated feedthrough 28.

In practice, any cell design may be utilized with the present invention, cell 10 merely representing an example of the type of cell utilized experimentally to test and prove the operability of the invention. Structural materials for the cell components can be selected from any number of a wide variety of conventional materials known in the art. There are also a large number of electrolytes containing alkali-metal ions in both molten and ceramic paste disk form known to the art and from which electrolyte 16 can be selected. While lithium is utilized as the anode reactant material in the specific examples given herein, sodium can also be used in a cell having the cathode structure of the present invention due to sodium's low electronegativity, low equivalent weight and known operability with sulfur and other cathode reactants in a secondary electrochemical cell.

Turning now to the cathode structure of the present invention, a porous substrate material which is impregnable by the chalcogen-containing reactant is utilized as the basic foundation of the structure. Any number of porous materials may be utilized in the present invention as long as the material is relatively corrosion resistant to the reactant and the electrolyte, is a good electrical conductor, and is impregnable by the chalcogen-containing reactant. Examples of such materials are porous graphite and porous carbon.

The porosity and pore size of the substrate material are very important to the present invention. A preferred porosity range is 85 to 92%, with about 90% porosity being the optimum. This large porosity results in a large number of interconnected pores, which is desirable in the present invention, and it also enables easier heating of the substrate material in the method of construction to be discussed later in this application. The average pore size should range from 50 to 500 $\mu$m with about 200 $\mu$m being preferred. This pore size enables the electronically-conducting material to enter the interconnected pores and deposit on a portion of the inner surfaces thereof.

The function of the electronically-conducting material in the present invention is to change the wetting characteristics of the porous substrate material so as to promote wetting by the electrolyte. Under normal circumstances, porous substrate material such as porous graphite is very readily wettable by chalcogen reactants, whereas it is not so wettable by molten-salt electrolytes containing alkali-metal ions. If both chalcogen reactant and electrolyte are present in the pores of such a substrate material, as in the present invention, the surfaces of the pores are virtually entirely wetted by the chalcogen reactant. Thus, electrons cannot easily reach the chalcogen-electrolyte interface. However, when the interconnected pores' surfaces are partially coated with an electronically-conducting metal which is wetted preferentially by such electrolyte, this enables both the chalcogen reactant and the electrolyte to wet portions of the surfaces of the substrate material's pores, thereby maximizing the zones where electrolyte, chalcogen reactant and electrons are all present.

The electronically-conducting material utilized in the cathode structure of the present invention can be selected from any number of metals which are electronically-conducting, resistant to the electrolyte and the reactant, and preferentially wettable by the electrolyte. Examples of such metals are chromium, molybdenum, niobium, tungsten and zirconium. However, chromium is preferred due to the relative ease with which it is deposited on the interior surfaces of the interconnected pores as discussed below.

The metal deposited on the inner surfaces of the interconnected pores should be sufficient to form layers on portions thereof, yet not so great as to entirely coat the surfaces of all the pores. The thickness of these layers is not as important as is the total metal loading (grams of metal per gram of substrate material) in the cathode structure. For example, if the electronically-conducting metal is chromium and the substrate material is 90% porosity graphite, a maximum of 5 volume percent chromium can be tolerated in the cathode structure when considering a number of factors such as the required reactant and electrolyte contents as well as the volume change occurring during cell discharge. With densities of 0.2 g/cm$^3$ for 90% porosity graphite and 7 g/cm$^3$ for chromium, this gives a maximum loading of about 1.7 grams of chromium per gram of graphite. Considering these factors, then, a preferred chromium loading range in this particular case is 0.05 to 0.5 gram of chromium per gram of graphite (or 0.01 to 0.1 gram of chromium per cm$^3$ of over-all substrate volume) with the preferred embodiment having a chromium loading of about 0.1 gram chromium/gram of graphite (0.02 gram/cm$^3$ of graphite). This electronically-conducting metal loading, then, is adequate to form sufficiently thick metal layers on portions of the interior surfaces of the substrate material's interconnected pores for the purposes of this invention.

The chalcogen-containing reactant utilized in the present invention may be chosen from any number of such reactants known in the art, some examples of such being those reactants disclosed in the previously mentioned U.S. patent application Ser. No. 401,729. Sulfur, however, is the preferred chalcogen, utilized either by itself as the reactant or in combination with other chalcogens such as selenium as well as mixed with various additives such as arsenic or thallium. In addition, as with the choice of electrolyte for use in cell 10, any of a large number of electrolytes containing alkali-metal ions known to the art may be utilized in the cathode structure of the present invention.

When the substrate structure which has the surfaces of its interconnected pores partially coated by an electronically-conducting metal is impregnated with the chalcogen-containing reactant, the reactant wets the uncoated portions of the pores' surfaces and partially fills the pores. When this structure is then impregnated by the electrolyte, the electrolyte wets the metal layers and fills the remaining volume within the interconnected pores. This resulting cathode structure, then, achieves a large and well dispersed electronically-conducting pathway throughout the entire structure for the electrons to flow to the numerous reactant-electrolyte reaction zones present in this cathode structure. This is achieved by the close proximity throughout the entire cathode structure of the chalcogen-containing reactant, the electrolyte and the electronically-conducting metal.

Since no known methods were adequate for constructing the cathode structure of the present invention, especially with regard to depositing the metal onto portions of the surfaces of the substrate material's interconnected pores, a new and novel method was devised. This method involves the vapor deposition of the metal onto the surfaces of the interconnected pores by thermally vaporizing a compound of the particular metal in the presence of an inert gas and then passing the compound vapor – inert gas mixture through the pores of the substrate material which is heated by an electric current, the compound decomposing upon contact with the hot substrate material. The particular compound chosen for the thermal decomposition should be sufficiently volatile to be vaporized conveniently into an inert gas stream at a reasonable temperature, for example below 250°C., yet the compound should be thermodynamically stable at the vaporization temperature and unstable at higher temperatures to enable the compound's decomposition and the metal's deposition.

A specific example illustrating this is the deposition of chromium into the pores of 90% porosity graphite. The particular compound chosen for thermal decomposition was dicumene chromium (DCC), $Cr[C_6H_5CH(CH_3)_2]_2$, although other possible compounds include chromium iodide and chromium carbonyl. While deposition of chromium by thermal decomposition of DCC has been utilized previously for plating a layer of chromium onto the outer surface of a structure for such purposes as decorative appearances, such was not capable of forming a layer of chromium on the interior surfaces of pores within a solid, porous structure. Therefore, the present method was developed.

The DCC was heated to approximately 200°C. with argon flowing across the top of the DCC bed at about 1,000 cc/min at a temperature of about 200°C. The DCC vapor mixed with the Ar gas, and this gas mixture was then passed through a 3.2 cm diameter × 0.7 cm thick graphite sample (91% porosity, 26–80 μm pore size) at a pressure of about 1 psig. The graphite sample was heated to about 420°–430°C. by standard induction heating, the heating mantle being located outside the enclosure containing the graphite sample. This procedure was followed for about 3 hours, after which the graphite was removed, cooled and examined. The results of the examination showed that there was significant deposition of the chromium only to a depth of approximately 0.1 mm with about 20% of the graphite's interconnected pores being at least partially coated with a layer of chromium. The non-uniformity and lack of penetration of the chromium plating were finally attributed to thermal gradients resulting from the external heating of the graphite as well as to leakage of the DCC-Ar gas around the edges of the graphite specimen, thereby creating gas flow gradients.

Therefore, the method was modified and improved upon, not only by providing a better seal around the graphite, but more importantly by changing the graphite heating technique so as to heat the graphite more uniformly. In lieu of the induction heating technique, then, an electric current was passed through the graphite sample. It was determined from a variety of tests that the greater the porosity of the graphite sample, the easier it was to uniformly heat the graphite, thereby decreasing the amount of current necessary to achieve a uniform 400°–450°C. temperature throughout the graphite, this high temperature being required to decompose the DCC. It was further determined that a current sufficient to generate heat in the graphite at the rate of about 12 to 15 watts per cm³ of graphite was required for graphite having a porosity of 85–92%, the preferred range, to achieve the preferred 400–450°C. temperature. It should be noted that the temperature of the graphite sample must not go below 380°C., for at temperatures below 380°C. the chromium deposited within the graphite will contain organic contaminants.

To assure that the required chromium loading in the graphite sample is achieved, a 33% over-all efficiency in the thermal decomposition of DCC and deposition of the chromium in the graphite was assumed. The maximum efficiency which can be assumed is about 50%. Since DCC contains 17.8% chromium by weight, approximately 17.5 grams of DCC must be decomposed to deposit one gram of chromium in the graphite sample at the 33% efficiency, and if a 50% efficiency is assumed, about 11 grams of DCC are required per gram of deposited chromium.

After the chromium has been deposited on a portion of the surfaces of the graphite's interconnected pores, both reactant and electrolyte are impregnated into the graphite. A number of methods of impregnating these materials into porous graphite are known to the art, and any of such methods may be utilized in the present invention. It would be desirable, however, to impregnate the chalcogen and the electrolyte at the same time in order to ensure uniformity in filling the pores, although there are problems of chalcogen vaporization when doing such. Therefore, it is preferred that the chalcogen reactant be impregnated into the graphite first.

In accordance with the present invention, then, approximately 3.5 grams of DCC are heated to a temperature of 200°C. in an enclosed system having an argon atmosphere, thereby vaporizing the DCC. Argon carrier gas at a temperature of about 200°C. is passed over the DCC at a rate of 500 ml/min (STP) so as to mix with the DCC vapor. This DCC-Ar gas mixture is then passed through a porous graphite disk (90% porosity, 200 μm avg. pore size, 5.04 cm diameter and 0.5 cm thickness) for a period of about 36 minutes. The graphite disk is maintained at a temperature of about 450°C. during this period by continuously passing a 12 to 15 ampere current through the disk using a voltage of 10 V. This results in a total chromium deposition of about 0.2 gram, or 0.02 gram of chromium/$cm^3$ of graphite. After the 36 minutes, the graphite disk is cooled and then impregnated with about 9 grams of a sulfur – 20 weight percent (w/o) arsenic reactant, the arsenic being added to the sulfur to lower the vapor pressure of the sulfur. This structure is cooled and then impregnated with about 3 grams of a LiF-LiCl-KCl eutectic electrolyte.

The novel cathode structure resulting from the above method has layers of chromium, the total chromium loading being 0.2 gram, on portions of the interior surfaces of the graphite disk's interconnected pores, these pores being filled with the S – 20 w/o As reactant and the LiF-LiCl-KCl electrolyte. This structure has an active cathode area of 20 $cm^2$ and a thickness of 0.5 cm.

The above structure is then enclosed in a porous graphite housing and placed in an electrochemical cell similar to that shown in the FIGURE. A porous nickel anode (80% porosity, 60 μm avg. pore size, 5.04 cm diameter and 0.5 cm thick) impregnated with 3 grams of lithium is also placed within and in contact with the molybdenum housing, the interelectrode distance being about 0.5 cm. The cathode lead is attached and 80 grams of LiF-LiCl-KCl eutectic electrolyte is melted into the cell at 380°–400°C. The cell is then sealed by welding the cell's molybdenum cover to the housing, and an electrically insulating feedthrough is secured in the molybdenum housing cover for the cathode lead. The cell is then operated at about 400°C. and with the cathode structure of the present invention, achieves a capacity density above a 1-volt cutoff of about 0.3 A-hr/$cm^2$ at a current density of 0.3 A/$cm^2$. Sulfur utilization is high at about 50%, and the cycle life and lifetime are about 500 cycles and > 1,000 hours, respectively. The total energy output of this electrochemical cell is 10 watt-hours with the average power being about 10 watts.

As can be seen from the above, the present invention's cathode structure and method of making this structure enables a considerable increase in the number of chalcogen-electrolyte reaction sites available within the cathode. This greatly enhances chalcogen utilization and aids in the problem of diffusion of the chalcogen-electrolyte reaction products away from the reaction sites. The cathode structure of the present invention would not have been possible, however, without the unique method devised for depositing the electronically-conducting metal onto the interior surfaces of the substrate material's interconnected pores.

It will be understood that the invention is not to be limited to the details given herein but that it may be modified within the scope of the appended claims.

The embodiments of the invention in which an exclusive property or privilege is claimed are defined as follows:

1. In a secondary electrochemical power-producing cell comprising an anode containing a molten alkali-metal of low electronegativity, an electrolyte containing alkali-metal ions, and a cathode containing a reactant comprising a chalcogen, the improvement wherein said cathode comprises a solid, porous substrate structure, impregnable and wettable by said reactant, having interconnected pores randomly interspersed throughout, said interconnected pores being filled with said electrolyte and said reactant; and an electronically conducting coating on a sufficient portion of the inner surfaces of said interconnected pores throughout said substrate to provide a network for electron flow to reactant-electrolyte reaction zones in substantially all inner regions of said substrate, said electronically conducting coating being of a metal that is preferentially wetted by said electrolyte and chemically resistant to both said electrolyte and said reactant.

2. The improvement according to claim 1 wherein said solid, porous substrate structure is composed of a material selected from the group consisting of porous graphite and porous carbon.

3. The improvement according to claim 2 wherein said electronically conducting coating is of a metal selected from the group consisting of chromium, molybdenum, niobium, tungsten and zirconium.

4. In a secondary electrochemical power-producing cell comprising an anode containing lithium, an electrolyte containing lithium ions, and a cathode containing a reactant comprising sulfur, the improvement wherein said cathode comprises a solid, porous substrate structure of graphite, impregnable and wettable by said reactant, having interconnected pores constituting 85 to 92% porosity randomly interspersed throughout said substrate; and electronically conducting metal comprising chromium in an amount of 0.01 to 0.1 gram per $cm^3$ of substrate volume coating a portion of the inner surfaces of said interconnected pores, said interconnected pores being filled with said electrolyte and said reactant.

* * * * *